Sept. 11, 1923.   1,467,548
W. M. LAWRENCE
LIQUID LEVEL INDICATOR
Filed March 18, 1922   2 Sheets-Sheet 1
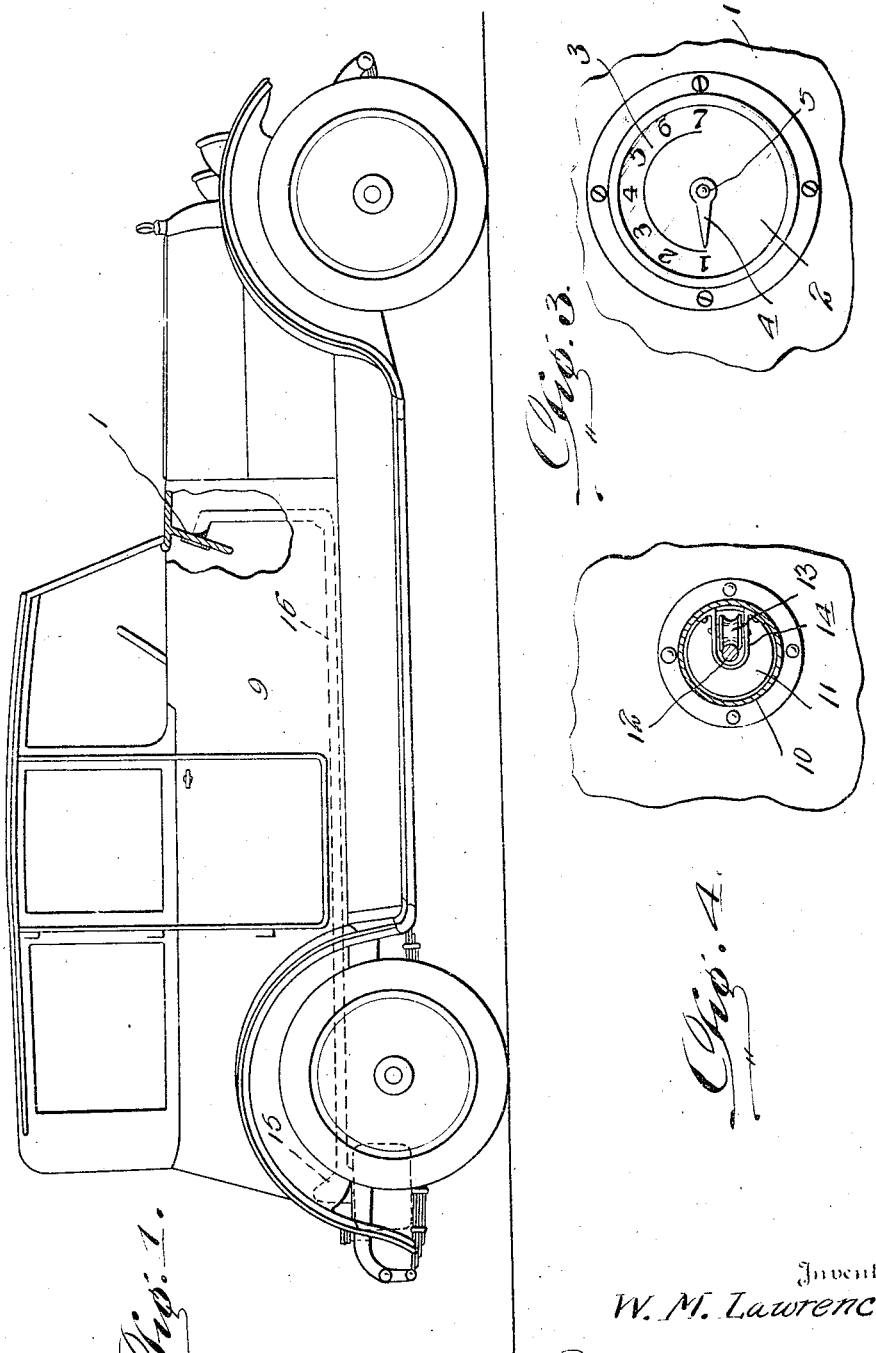
Inventor
W. M. Lawrence,
By Clarence A. O'Brien
Attorney
Witnesses:-
Hyman Berman
William Thickstun

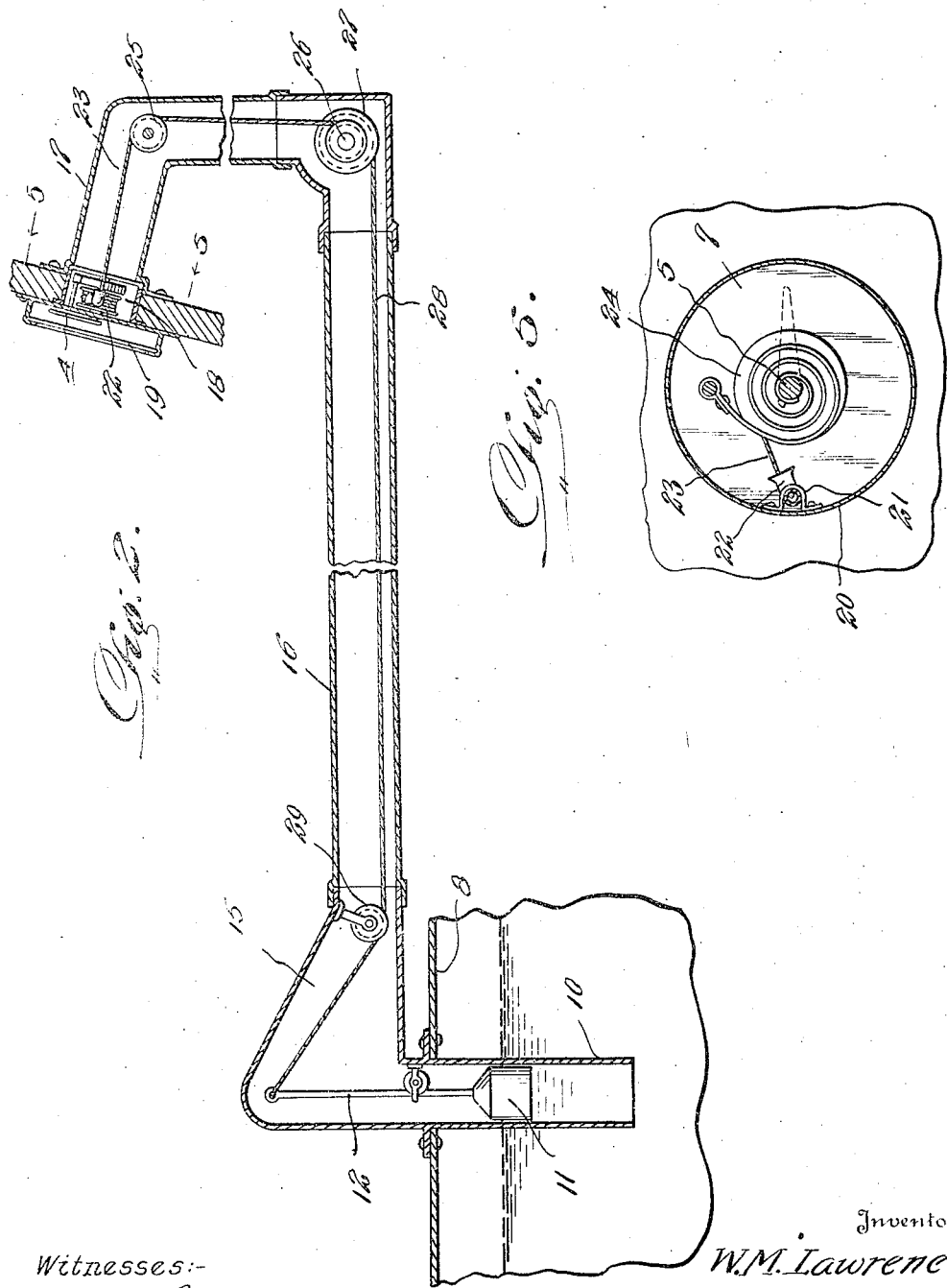

Patented Sept. 11, 1923.

1,467,548

UNITED STATES PATENT OFFICE.

WILLIAM M. LAWRENCE, OF COEBURN, VIRGINIA.

LIQUID-LEVEL INDICATOR.

Application filed March 18, 1922. Serial No. 544,721.

*To all whom it may concern:*

Be it known that I, WILLIAM M. LAWRENCE, a citizen of the United States, residing at Coeburn, in the county of Wise and State of Virginia, have invented new and useful Improvements in Liquid-Level Indicators, of which the following is a specification.

The object of my said invention is the provision of a simple and inexpensive organization for apprising the driver of an automobile of the amount of gasolene in the tank usually carried at the back of an automobile, and one not liable to be affected by the vibration and shock and jar incident to the operation of an automobile.

To the attainment of the foregoing, the invention consists in the improvement as hereinafter described and definitely claimed.

In the accompanying drawings, forming part of this specification:—

Figure 1 is a side elevation, partly in section, of an automobile equipped with my improvement.

Figure 2 is an enlarged, longitudinal vertical broken section illustrative of the improvement.

Figure 3 is an enlarged elevation showing the dial and pointer on the instrument board of the automobile.

Figure 4 is a detail horizontal section taken through the well and showing an antifriction pulley and the float rod.

Figure 5 is an enlarged detail section showing the parts adjacent to the spindle on the pointer.

Similar numerals of reference designate corresponding parts in all of the views of the drawings.

In furtherance of my invention I provide on the instrument board 1 of an automobile, a dial 2, characterized by an arcuate scale 3 with divisions numbered in regular sequence, preferably from 1 to 7 as best shown in Figure 3.

Movable in opposed relation to the dial 2 is a pointer 4 which is adapted to be swung to and fro through the medium of a spindle 5. When deemed expedient the dial 2, and the pointer 4 may be covered by a transparent disk as shown in Figure 3. This, however, is not of the essence of my invention and, therefore, the said disk may be omitted when desired without affecting the invention as claimed. As best shown in Figure 5, the spindle 5 is connected to one end of a spring 6, the opposite end of which is connected through a housing wall 7. Said spring has for its function to yieldingly hold the pointer 4 in the position shown in Figure 3 and to resist yieldingly the movement of the said pointer 4 from the initial position shown in Figure 3 to the position where the pointer is directed toward the numeral 7. In other words when seven gallons of gasolene, for instance, are contained in the tank designated by 8, and the pointer 4 is directed toward the numeral 7, Figure 3, the spring 6 is under tension and tends to rock the spindle 5 and turn the pointer 4 toward the numeral 1.

The tank 8 is ordinarily carried at the back of the automobile designated generally by 9, and in the said tank 8 is a well 10 in which is movable vertically a float 11 which per se may be of any type compatible with the purpose of my invention. Fixed to and extending upwardly from the float 11 is a rod 12. The said rod 12 is arranged to work against a circumferentially grooved pulley 13, Figures 2 and 4, and is guided between the said pulley and a bail-shaped bracket 14 in which the pulley is mounted and adapted to freely turn.

The upper end of the well 10 is merged into the rear enlargement 15 of a tubular housing 16 which is appropriately carried by the automobile and is extended forwardly and upwardly and then rearwardly, as designated by 17 in Figure 2 and is arranged in communication with a chamber or housing 18 characterized by the before mentioned wall 7. The glass or transparent disk before referred to is designated by 19 in Figure 2. Connected to the circular wall 20 of the chamber or housing 18, as best shown in Figures 2 and 5 is a bracket 21 in which is mounted a tubular guide 22 of general right angle formation. The said guide 22 serves for the passage and guideness of a cable 23 which may be of any appropriate material. One end of the said cable 23 is connected to and adapted to be taken up on a pulley 24, fixed on the spindle 5. After passage through the tubular guide 22, the cable 23 is passed over a pulley 25 and is connected to and adapted to be taken up on a pulley 26. Fixed with respect to the pulley 26 so as to turn therewith is a pulley 27, Figure 2, and connected to and adapted to be taken up on a pulley 27 is a second cable 28 which is carried rearwardly in engagement with a pulley 29, Figure 2, and is connected at its rear end to the upper end of the rod 12.

In virtue of the proportional sizes of the pulleys 27 and 26 the rectilinearly movements of the float 11 will be converted into rotary motion, and the motion will be reduced to such an extent as to assure the swinging of the pointer 4 through the half circle hereinbefore referred to and thus shown in Figure 3.

It will be apparent from the foregoing that incident to the use of my novel indicator, the driver of the automobile will be kept informed at all times of the amount of gasolene in the gasolene tank, this being due to the fact that as gasolene is taken from the tank, the pointer will swing or move toward the left in Figure 3. When the pointer approaches the numeral 1 of the dial the automobile driver will be put on notice to the effect that his supply of gasolene is almost depleted. Again when gasolene is supplied to the tank to the full capacity of seven gallons, the pointer under the control of the float will be moved to the extreme full position at the right of Figure 3.

It will be manifest from the foregoing that my improvement is simple, inexpensive and susceptible of being quickly and easily installed; also, that the free working of the mechanism is not liable to be affected by the vibration and by the shocks and jars ordinarily incident to the movement of an automobile over rough roads.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

A gasolene indicator for automobiles comprising a gasolene tank, a well therein, a float movable vertically in the well and having an upwardly extending rod, a bail-shaped bracket in the well and supporting a pulley thereon, the said rod extending between the pulley and adjacent side of the bracket, a housing portion arranged over said rod, a housing extending forwardly and upwardly from said housing portion, a dial, a pointer movable adjacent to the dial, a spindle carrying said pointer and arranged in the housing, a spring to turn said spindle in one direction, a pulley on the spindle, a differential pulley mounted in the housing, a cable operatively connecting one member of the differential pulley and the first-named pulley, and a second cable operatively connecting the other member of the differential pulley and the float rod.

In testimony whereof, I affix my signature.

WILLIAM M. LAWRENCE.